L. M. COOPER.
DEMOUNTABLE RIM.
APPLICATION FILED MAY 1, 1916.
1,223,312.
Patented Apr. 17, 1917.
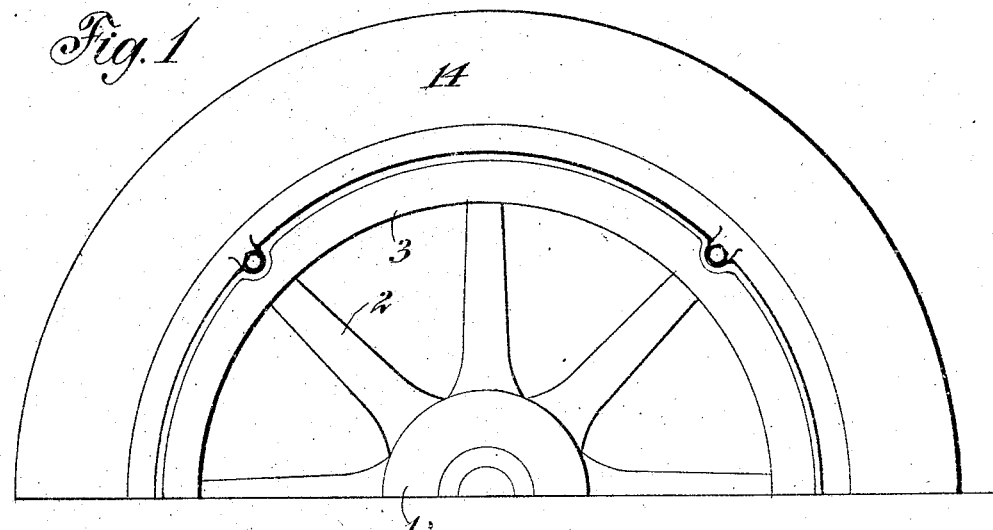
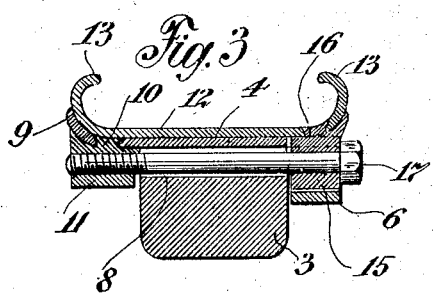
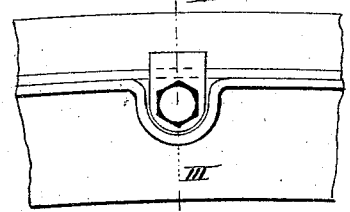
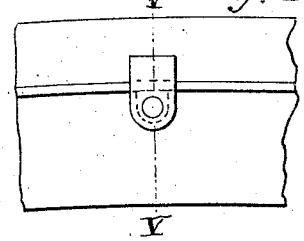
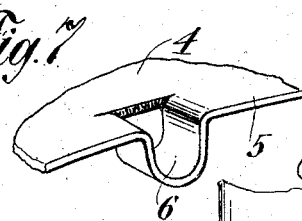
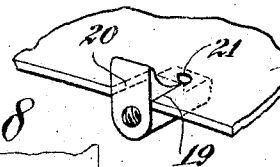
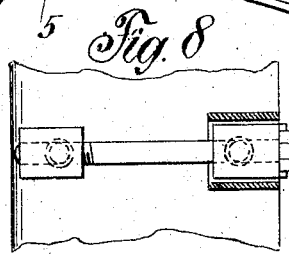
Inventor
Lyman M. Cooper
Witnesses
Charles Belg
Karl H. Butler
Attorneys

UNITED STATES PATENT OFFICE.

LYMAN M. COOPER, OF DETROIT, MICHIGAN, ASSIGNOR OF ONE-HALF TO AUGUST T. BIRK, OF OWOSSO, MICHIGAN.

DEMOUNTABLE RIM.

1,223,312.

Specification of Letters Patent. Patented Apr. 17, 1917.

Application filed May 1, 1916. Serial No. 94,555.

*To all whom it may concern:*

Be it known that I, LYMAN M. COOPER, a citizen of the United States of America, residing at Detroit, in the county of Wayne and State of Michigan, have invented certain new and useful Improvements in Demountable Rims, of which the following is a specification, reference being had therein to the accompanying drawings.

This invention relates to rims for vehicle wheels, and the object of my invention is to provide simple and efficient means, in a manner hereinbefore set forth, for connecting a demountable rim to a wheel felly or fixed rim, whereby an injured tire carried by the demountable rim can be easily and quickly removed from a wheel and a new tire or demountable rim substituted therefor.

A further object of my invention is to provide a demountable rim fastening means consisting of comparatively few parts that are inexpensive to manufacture, durable and highly efficient for the wheels of an automobile.

I attain the above and other objects by a mechanical construction that will be hereinafter specifically described and then claimed, and reference will now be had to the drawing, wherein—

Figure 1 is a side elevation of a portion of a wheel provided with a demountable rim, and fastening means in accordance with my invention;

Fig. 2 is an enlarged elevation of the outer side of a portion of the demountable rim;

Fig. 3 is a cross sectional view taken on the line III—III of Fig. 2;

Fig. 4 is an elevation of the inner side of a demountable rim, illustrating a slight modification of my invention;

Fig. 5 is a cross sectional view taken on the line V—V of Fig. 4;

Fig. 6 is a perspective view of a portion of a fixed rim forming part of the modified form;

Fig. 7 is a perspective view of the outer edge of a portion of the fixed rim of the preferred form of construction; and Fig. 8 is a plan of the inner side of a portion of the preferred form of fixed rim.

In the drawing, 1 denotes a portion of a wheel hub having spokes 2 supporting a felly 3 provided with a fixed rim 4. The rim 4 is fixed upon the periphery of the felly 3 in the usual and well known manner and said fixed rim is of a greater width than the periphery of the felly, said fixed rim having an outer flat edge 5 provided with spaced depressed yoke portions 7 registering with transverse grooves 8 in the periphery of the felly 3, beneath the fixed rim 4. The fixed rim 4 has the inner edge thereof curved outwardly, as at 9, and connected thereto by rivets 10 or other fastening means are spaced stationary nuts 11 in transverse alinement with the grooves 8 of the felly 3. Mounted upon the fixed rim 4 and slidable thereon from the outer edge 5 of said fixed rim is a demountable rim 12 limited in its sliding on movement by the curved outer edge 9 of the fixed rim. The demountable rim has clencher edges 13 and is adapted for holding a pneumatic tire 14.

The outer edge of the demountable rim 12 is provided with spaced lugs 15 riveted or otherwise connected to the demountable rim, as at 16, and projecting inwardly, said lugs corresponding in spacing and number to the yoke depressions 6 of the fixed rim 4, whereby said lugs can extend into the yoke depressions, as best shown in Figs. 3 and 8. The lugs 15 are apertured to receive bolts 16 and these bolts are adapted to extend through the grooves 8 of the felly 3, into screwthreaded engagement with the stationary lugs 11, carried by the fixed rim 4, thereby locking the demountable rim 12 against lateral or circumferential shifting upon the fixed rim 4. The stationary nuts 11 are shaped to conform to and brace the curved inner edge 9 of the fixed rim 4, and the lugs 12 are shaped to conform to and brace the outer clencher edge 13 of the demountable rim 12.

In Figs. 4 to 6 inclusive, there is illustrated a slight modification of my invention, particularly in connection with the inner edge of a fixed rim 18. The inner edge of the rim 18 is flat, similar to the outer edge thereof, but is slotted, as at 19, to receive a stationary nut 20 riveted or otherwise connected to the fixed rim 18, as at 21. The nuts 20 are shaped to brace the inner clencher edge of a demountable rim 22, and said nuts are adapted to be held by transverse bolts 23 in a manner similar to the preferred form of construction.

It is thought that the manner of removing a demountable rim relative to a wheel will be apparent without further description, and while in the drawings, there are illustrated a preferred embodiment of my invention, it is to be understood that the structural elements are susceptible to such variations and modifications as fall within the scope of the appended claim.

What I claim is:—

In a vehicle wheel, a wood felly having transverse peripheral grooves, a fixed rim on said felly having a curved inner edge and depressions at the outer edge thereof, said fixed rim closing said felly grooves with the exception of the ends thereof and having its depressions registering with the ends of said grooves, nuts riveted to the inner edge of said fixed rim and bracing the curved inner edge of said fixed rim by contacting therewith, a demountable rim on said fixed rim having lugs secured thereto and extending into the depressions of said fixed rim, and screw bolts extending through the lugs of said demountable rim and through the grooves of said wood felly into the nuts carried by said fixed rim.

In testimony whereof I affix my signature in presence of two witnesses.

LYMAN M. COOPER.

Witnesses:
 LEWIS E. FLANDERS,
 ANNA M. DORR.